United States Patent
Gryc

(10) Patent No.: US 7,526,284 B2
(45) Date of Patent: Apr. 28, 2009

(54) METHOD AND SYSTEM FOR ACOUSTIC UPGRADING OF FIRMWARE

(75) Inventor: Andrew J. Gryc, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 286 days.

(21) Appl. No.: 10/197,749

(22) Filed: Jul. 18, 2002

(65) Prior Publication Data
US 2004/0014463 A1    Jan. 22, 2004

(51) Int. Cl.
G05B 19/42 (2006.01)
G06F 19/00 (2006.01)

(52) U.S. Cl. .................. 455/419; 381/86; 341/176; 701/29; 701/33; 719/322

(58) Field of Classification Search ......... 455/418–420, 455/142–143, 45, 414.1, 3.06, 3.02, 403; 709/220–221; 701/33, 29, 35, 2, 4, 36, 31; 719/322; 386/83, 104, 126; 379/102.01, 379/102.02, 103.03; 381/77, 86; 341/50, 341/176
See application file for complete search history.

(56) References Cited

U.S. PATENT DOCUMENTS

| | | | |
|---|---|---|---|
| 6,198,946 B1 * | 3/2001 | Shin et al. ................... 455/561 |
| 6,389,055 B1 * | 5/2002 | August et al. ................ 375/130 |
| 6,532,406 B1 * | 3/2003 | Schmedding et al. ......... 701/29 |
| 6,567,745 B2 * | 5/2003 | Fuchs et al. .................. 701/209 |
| 6,608,993 B1 * | 8/2003 | Ficco ......................... 455/3.06 |
| 6,636,790 B1 * | 10/2003 | Lightner et al. ............... 701/33 |
| 6,718,407 B2 * | 4/2004 | Martwick ..................... 710/51 |
| 6,834,156 B1 * | 12/2004 | Marko et al. ................. 386/94 |
| 6,876,835 B1 * | 4/2005 | Marko et al. ............... 455/3.06 |
| 6,980,137 B2 * | 12/2005 | Parry et al. .................... 341/50 |
| 2002/0049535 A1 * | 4/2002 | Rigo et al. ................... 701/211 |
| 2002/0055343 A1 * | 5/2002 | Stetzler et al. .............. 455/260 |
| 2002/0072326 A1 * | 6/2002 | Qureshey et al. ........... 455/3.02 |
| 2002/0091807 A1 * | 7/2002 | Goodman .................... 709/221 |
| 2002/0164973 A1 * | 11/2002 | Janik et al. .................. 455/403 |
| 2003/0158614 A1 * | 8/2003 | Friel et al. .................... 700/94 |
| 2003/0203714 A1 * | 10/2003 | Videtich et al. ............ 455/3.04 |
| 2004/0114772 A1 * | 6/2004 | Zlotnick ....................... 381/92 |
| 2004/0187011 A1 * | 9/2004 | Lee et al. ..................... 713/193 |
| 2005/0060246 A1 * | 3/2005 | Lastinger et al. .............. 705/28 |

* cited by examiner

Primary Examiner—George Eng
Assistant Examiner—Brandon J Miller

(57) ABSTRACT

The invention provides a method for acoustic upgrading of firmware by multiplexing at least one data instruction within an audible data stream and placing the audible data stream within an audible media. The audible media is executed to produce an audible signal that is received by a programmable device. The programmable device is programmed as a function of the audible signal.

20 Claims, 4 Drawing Sheets

METHOD AND SYSTEM FOR ACOUSTIC UPGRADING OF FIRMWARE

FIELD OF THE INVENTION

In general, the invention relates to communication networks. More specifically, the invention relates to data transmission for a wireless communication network and in particular, to a method and system for programming attributes and associated information to a wireless communication unit.

BACKGROUND OF THE INVENTION

Telematic communication units (TCU's), such as cellular phones, personal data assistants (PDA's), Global Positioning System (GPS) devices, and on-board Vehicle Communication Units (VCU's), used in conjunction with a Wide Area Network (WAN), such as a cellular telephone network or a satellite communication system, have made it possible for a person to send and receive voice communications, data transmissions, and facsimile (FAX) messages from virtually anywhere on earth. Such communication is initiated at the TCU when it is turned on, or by entering a phone number to be called, or in many cases, by pressing a preprogrammed button on the TCU or speaking a voice command causing the TCU to automatically complete the process of dialing the number to be called. A radio communication link is established between the TCU and a Wide Area Network (WAN), using a node of the WAN in the vicinity of the TCU. In cellular telephone systems, a node is commonly referred to as a "cellular base station." Once the radio communication link between the TCU and the cellular base station has been established, the base station may utilize a combination of additional cellular stations, conventional telephone wire line networks, and possibly even satellite systems to connect the TCU to the number to be called.

Wireless communication services offered by the cellular base station, such as navigation and roadside assistance for TCU users, have greatly increased in recent years. More specialized services are now offered for VCU users, and may aid motor vehicle operations and include services that provide location and destination information. Such services are provided at a cost to the VCU users, and at a cost to the VCU service provider. Certain classes of VCU services require the periodic access and programming of vehicle specific systems in order to initiate the VCU services. These data intensive services can potentially have significant transmission (uploading) costs associated with them, again at a cost to the VCU service provider and ultimately the VCU users. Currently, two methods exist to upload (upgrade) the vehicle specific systems, both with disadvantages. One is to allow the system to be updated via a data call from a Call Center to the VCU. This is an expensive alternative, since it may require a very long phone call, and each vehicle to be updated must receive a separate phone call. The second alternative is to have the vehicle specific systems updated by attaching a Tech Tool to the vehicles communication bus. The Tech Tool equipment is not available to a normal customer, and so the vehicle must be brought into a dealer, causing potential scheduling and monetary problems for the VCU users.

Some current navigation systems allow updating their program code via an optical disc (CD). These units however, use a more capable CD drive that has the ability to read the CD contents as data instead of audio. The standard CD player in a vehicle does not typically have the ability to read data CDs, nor does it have a way to make the audio data available on the vehicle bus.

Thus, there is a significant need for a method and system for optimizing wireless communication data uploading, and vehicle systems programming that overcome the above disadvantages and shortcomings, as well as other disadvantages.

SUMMARY OF THE INVENTION

One aspect of the invention provides a method for acoustic upgrading of firmware by multiplexing at least one data instruction within an audible data stream, placing the audible data stream within an audible media, and executing the audible media as an audible signal. The method continues by receiving the audible signal by a programmable device and programming the programmable device as a function of the audible signal.

Another aspect of the invention provides a system for acoustic upgrading of firmware. The system includes a means for multiplexing at least one data instruction within an audible data stream, means for placing the audible data stream within an audible media, and means for executing the audible media as an audible signal. Additionally, the system provides a means for receiving the audible signal by a programmable device and means for programming the programmable device as a function of the audible signal.

Another aspect of the invention provides a computer readable medium for storing a computer program. The computer program is comprised of computer readable code for computer readable code for multiplexing at least one data instruction within an audible data stream, computer readable code for placing the audible data stream within an audible media, and computer readable code for executing the audible media as an audible signal. Additionally, computer readable code for receiving the audible signal by a programmable device, and computer readable code for programming the programmable device as a function of the audible signal.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
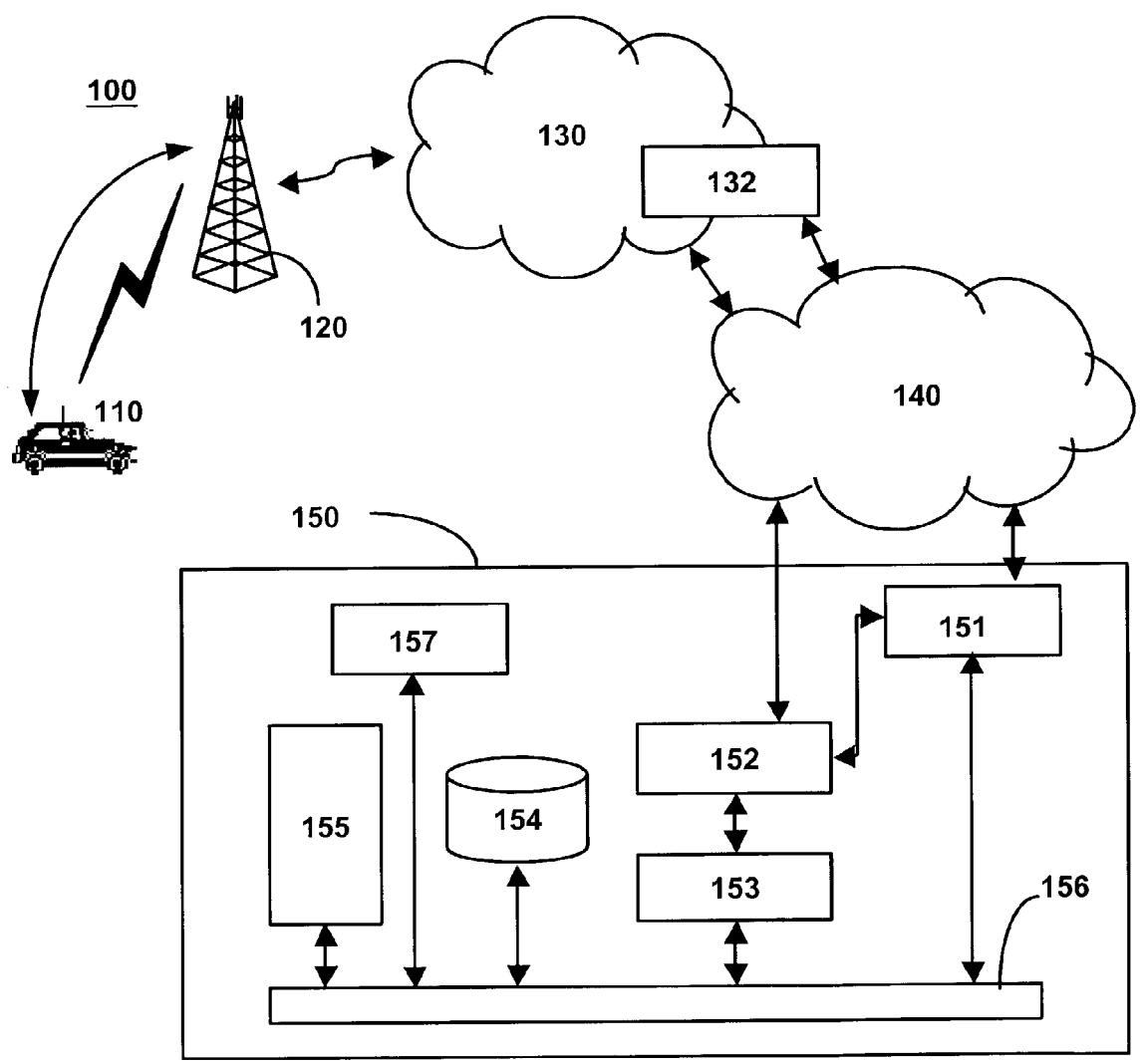
FIG. 1 is a schematic diagram for one embodiment of a system for accessing a mobile vehicle using a wireless communication system, in accordance with the current invention.

FIG. 1 is an illustration depicting one embodiment of a system for communicating with a mobile vehicle using a wireless communication system in accordance with the present invention, and may be referred to as a mobile vehicle communication system (MVCS) 100, and in one embodiment may include the OnStar system as is known in the art. The mobile vehicle communication system 100 may contain one or more mobile vehicles 110, with the wireless communication system containing one or more wireless carrier systems 120, one or more communication networks 130, one or more short message service centers 132, one or more land networks 140, and one or more call centers 150. Call center 150 may contain one or more switches 151, one or more data transmission devices 152, one or more communication services managers 153, one or more communication services databases 154, one or more advisors 155, one or more enterprise bus systems 156, and one or more automated speech recognition (ASR) units 157. The term "data" throughout the detailed description may refer to at least one datum, or a multitude of data.

Mobile vehicle 110 may contain a wireless telematic communication unit (TCU), such as a cellular phone, personal data assistant (PDA), global positioning system (GPS) device, and/or an on-board vehicle communication unit (VCU), with suitable hardware and software for transmitting and receiving data communications. The VCU may contain a wireless modem for transmitting and receiving data, and a digital signal processor with software and additional hardware to enable communications between the mobile vehicle 110 and one or more of the remaining MVCS 100 components. The GPS unit within mobile vehicle 110 may be capable of determining synchronized time and a geophysical location of the mobile vehicle 110. Mobile vehicle 110 may contain a speech recognition system (ASR) capable of communicating with the VCU. The VCU may additionally be capable of functioning as one or more of the above communication devices and, for one embodiment of the invention, may include at least one function from the list of data storage, data retrieval, receiving data queries, processing data queries, and transmitting data queries.

Wireless carrier system 120 may be a wireless communications carrier or a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center, and may comprise services from one or more wireless communications companies. Communications network 130 may be any suitable system or collection of systems for connecting wireless carrier system 120 to at least one mobile vehicle 110 or to a call center 150. Communications network 130 may include one or more short message service centers 132.

Short message service center 132 may prescribe alphanumeric short messages to and from mobile vehicles 110. Short message service center 132 may include message entry features, administrative controls, and message transmission capabilities. Additionally, short message service center 132 may store and buffer the messages. The short message service center 132 may include one or more automated speech recognition (ASR) units. The short message services offered may include functional services such as paging, text messaging and message waiting notification.

Land network 140 may be a public-switched telephone network, and may be comprised of a wired network, an optical network, a fiber network, another wireless network, or any combination thereof. The land network 140 may also include an Internet protocol (IP) network. Land network 140 may connect communications network 130 to the call center 150. Land network 140 may connect a first wireless carrier system 120 with a second wireless carrier system 120. Communication network 130 and land network 140 may connect wireless carrier system 120 to a communication node or call center 150. In one embodiment of the invention, a communication system may reference all or part of the wireless carrier system 120, communications network 130, land network 140, and short message service center 132.

Call center 150 may be a location where many calls can be received and serviced at the same time, or where many calls may be sent at the same time. The call center 150 may be a telematic call center, prescribing communications to and from mobile vehicles 110. The call center 150 may be a voice call center, providing verbal communications between an advisor in the call center 150 and a subscriber in a mobile vehicle 110. The call center 150 may be a voice activated call center, providing verbal communications between an ASR unit and a subscriber in the mobile vehicle 110. The call center 150 may contain any of the previously described functions, and may contain any combination of hardware or software facilitating data transmissions between call center 150 and mobile vehicle 110.

The call center 150 may contain or be in communication with the MNI, therefore any reference to the MNI within embodiments of this invention may provide the MNI in part, in whole, or in a combination of intelligence within the wireless carrier system 120, communications network 130, and the call center 150. The call center 150 may further contain a switch 151. Switch 151 may be connected to land network 140, and may receive a modem signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via enterprise bus system 156. Switch 151 may receive from or send voice transmissions to one or more automated speech recognition (ASR) units 157 via enterprise bus system 156.

Data transmission device 152 may send or receive data from switch 151, and may be an IP router or a modem. Data transmission device 152 may transfer data to or from advisor 155, one or more communication services managers 153, one or more communication services databases 154, one or more automated speech recognition (ASR) units 157, and any other device connected to enterprise bus system 156. Furthermore, data transmission device 152 may convey information received from short message service center 132 in communication network 130 to communication services manager 153.

Communication services manager 153 may be connected to switch 151, data transmission device 152, and advisor 155 through enterprise bus system 156. Communication services manager 153 may receive information from mobile vehicle 110 through wireless carrier system 120, short message service center 132 in communication network 130, land network 140, and data transmission device 152. Communication services manager 153 may send information to mobile vehicle 110 through data transmission device 152, land network 140, communication network 130 and wireless carrier system 120.

Communication services manager 153 may send short message service messages via short message service center 132 to the mobile vehicle. Communication services manager 153 may receive short message service replies from mobile vehicle 110 via short message service center 132. Additionally, communication services manager 153 may send a short message service request to mobile vehicle 110.

In another embodiment of the invention, short message service (SMS) communications may be sent and received according to established. Similar to paging, an SMS communication may be posted along with an intended recipient, such as a communication device in mobile vehicle 110. The SMS communication may be sent by a communication services manager 153 in the call center 150, transferred to a short message service center (SMSC), and conveyed to the intended recipient.

Communication services database 154 may contain records on one or more mobile vehicles 110. A portion of communication services database 154 may be dedicated to short message services. Records in communication services database 154 may include vehicle identification, location information, diagnostic information, status information, recent action information, and vehicle passenger (user) and operator (user) defined preset conditions regarding mobile vehicle 110. Communication services database 154 may provide information and other support to communication services manager 153, and to external services. External services can be for example, vehicle repair services, rental agencies, marketing firms, manufacturers, and wireless carriers.

Figure 2:
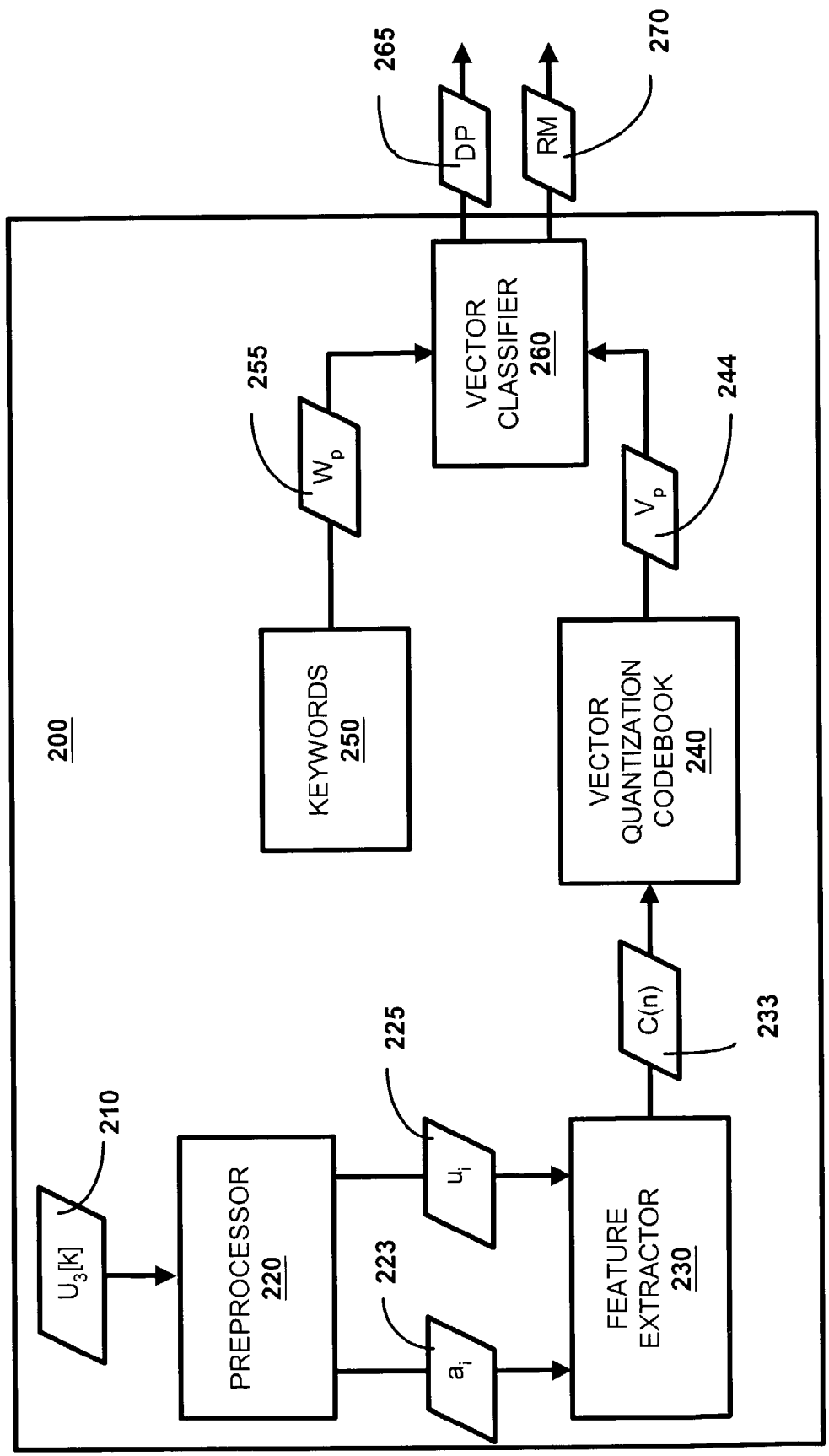
FIG. 2 is a schematic view of one embodiment of an apparatus capable of utilizing the systems of FIG. 1, in accordance with the present invention.

FIG. 2 illustrates one embodiment of an ASR unit 200 for ascertaining the acceptability of a spectral vector $V_p$. A preprocessor 220 may receive a speech signal $U_3[k]$ 210 and in response, provide a set of pole-zero coefficients $a_i$ 223 and $u_i$ 225. The preprocessor 220 may use the assumption that the speech signal $U_3[k]$ 210 is a linear combination of L previous samples. In one embodiment of the invention, the $a_i$ 223 coefficients may be the resulting predictor coefficients, which may be chosen to minimize a mean square filter prediction error signal e[k] summed over an analysis window. Another embodiment of the invention may provide the preprocessor 220 to transform the speech signal $U_3[k]$ 210 into a representation of a corresponding spectral signal $U_3(z)$.

A feature extractor 230 may receive pole-zero coefficients $a_i$ 223 and $u_i$ 225, and in response thereto, provide a set of cepstral coefficients C(n) 233 representative of a spectral parameters corresponding to speech signal $U_3[k]$ 210. A vector codebook 240 may receive cepstral coefficients C(n) 233 and conventionally provide spectral vector $V_p$ 244. In one embodiment of the invention, vector codebook 240 may conventionally transform the cepstral coefficients C(n) 233 to the spectral vector $V_p$ 244. A vector classifier 260 may receive the spectral vector $V_p$ 244 as well as keyword $W_p$ 255 from a keywords module 250. It may be assumed that the dimension of the spectral vector $V_p$ 244 and keyword $W_p$ 255 is m. Another embodiment of the invention may respond that the vector classifier 260 provide either the data packet DP 265 or the rejection message RM 270. Additionally, the keywords module 250 can be designed to produce voice recognition topics, which may be a group of words, pronunciations, and corresponding word usage statistics (language modeling), created for a specific subject, such as interstate travel, and vehicle user preferences (presets).

ASR unit 200 may consist of digital and/or analog hardware, software, or a combination of hardware and software. In alternative embodiments, ASR unit 200 may be incorporated within a wireless network, a wireline network, a filtering system, or distributed among a transceiver, a wireless network, a wireline network and/or a filtering system.

Figure 3:
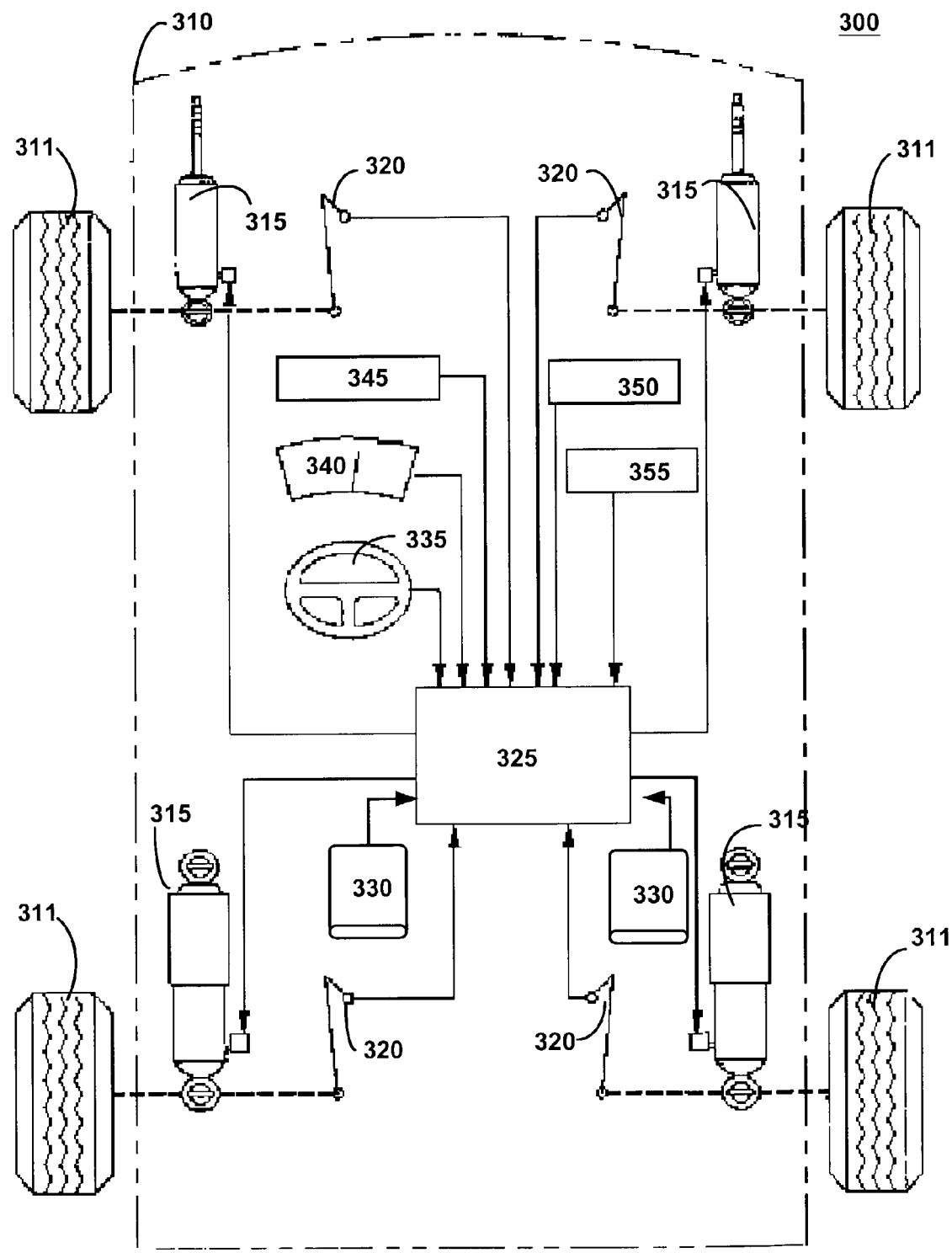
FIG. 3 is a schematic view of one embodiment of an apparatus capable of utilizing the systems of FIG. 1 and FIG. 2, in accordance with the present invention.

FIG. 3 illustrates one embodiment of the invention as an example mobile vehicle (vehicle) 300, and may utilize one or more embodiments previously detailed. For one embodiment of the invention, the vehicle 300 may be comprised of a vehicle body 310 supported by four wheels 311 and by four suspension devices including springs (not shown), all of a type known in the art. Each suspension may include a variable-force real time controllable damper 315, connected to exert a vertical force between wheel 311 and body 310 at that suspension point. There are many such suspension arrangements known in the art and all are appropriate to this invention.

Each corner of the vehicle may include a linear position sensor 320 that may be relate specific settings specifying the allowable relative distance between the vehicle wheel and the suspended vehicle body for each corner of the vehicle. Suitable position sensors 320 can be easily constructed by those skilled in the art and any type of position sensor known in the art may be used. Each position sensor 320 may provide a signal to a VCU module 325, as well as to each devices associated controlling mechanism.

In another embodiment of the invention, the suspension sensor data of the position sensors 320 may be reprogrammed for optimal performance by an upgrade received from a radio/CD player 345. The radio/CD player 345 may be in communication with an output device (speaker) and input device (microphone), and may be capable of analog/digital translation. Additionally, an embodiment of the invention may include programmable features for one or any combination of vehicle attributes including seat position 330, vehicle maximum speed 340, steering wheel angular position 335, radio/CD player settings 345, climate control (for variable atmospheric conditions) 350, and accessories such as mirror setting, dash lights, etc 355. An additional embodiment of the invention may include programmable attributes from various vehicle and communication devices known in the art and not previously mentioned.

Figure 4:
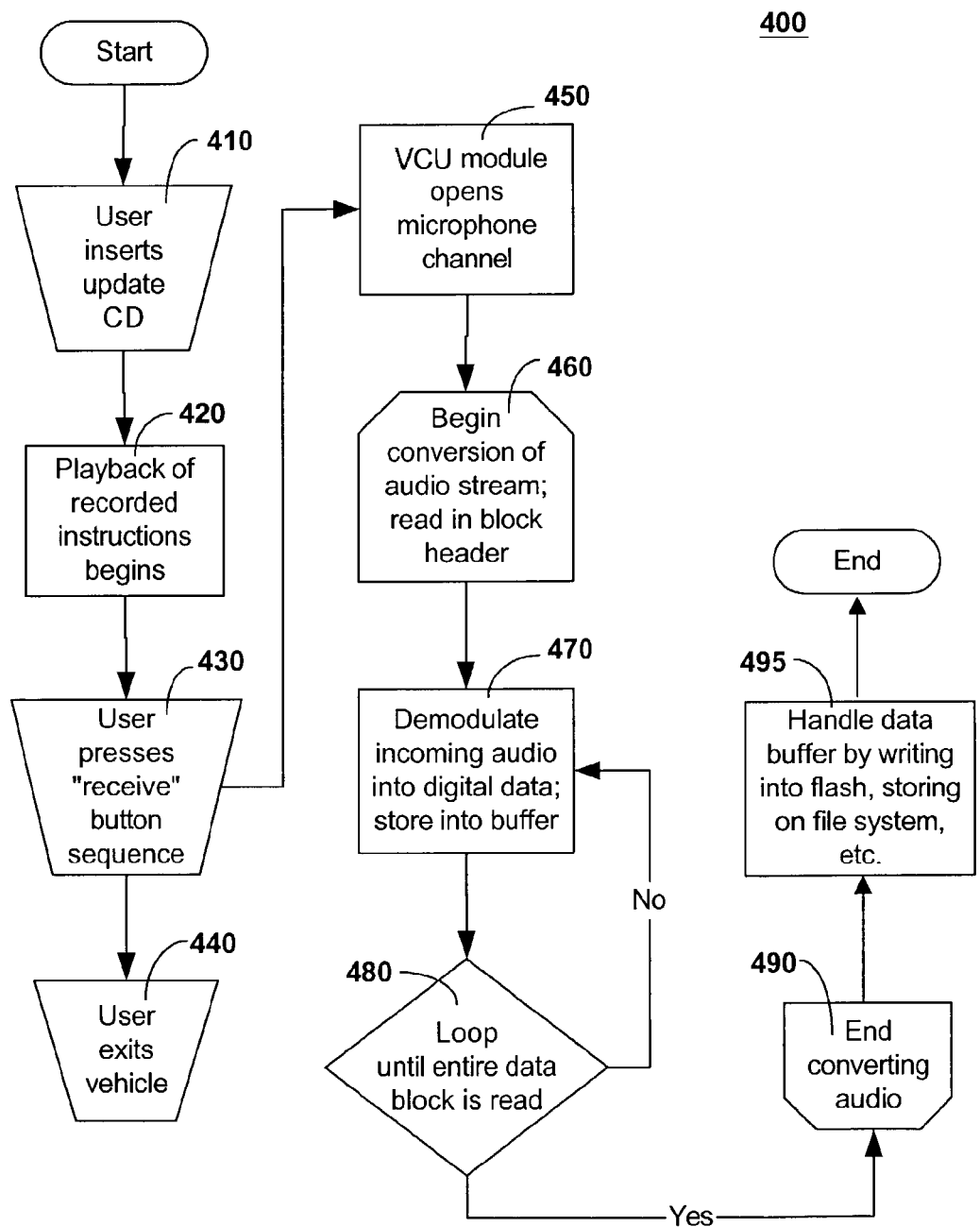
FIG. 4 is a flow chart representation for one embodiment of a vehicle data upload method utilizing the systems of FIG. 1 and FIG. 2, in accordance with the present invention.

FIG. 4 is a flow chart representation for one embodiment of an acoustic upgrading of firmware method 400, utilizing one or more of the systems previously described in accordance with the present invention. The functionality of this embodiment may provide an inexpensive method of delivering a large amount of data to a vehicle. For one embodiment of the invention, a typical use of the method 400 could be to provide a complete system flash update, or something else that requires 1) distribution to a large number of vehicles, 2) a large amount of data, and 3) limited customer interaction.

An embodiment of the invention may provide that data instructions associated with programming a device may be multiplexed within an audible data steam that could be inserted into an audible media such as a memory chip, a magnetic tape, a magnetic disk, and/or minted onto an optical or compact disk (CD). The audible media may provide when played, brief audio instructions followed by a modulated data signal. The customer would be able to insert the CD or other recordable media, into their (CD) player 410 and listen to the instructions. While the programmable unit (device) is in a receive mode, it may listen for a modulated data signal. The beginning of a data block may contain a block header with pertinent information about the data, such as what to do with the block (write it into flash, store as file, etc.), The analog instructions may 420 provide details on how to initiate the data transfer, possibly by pressing a seldom used combination of buttons 430. For one embodiment of the invention, the programmable device or unit may be placed in a receive mode. The instructions may tell the user to leave the vehicle 440 unattended for some duration of time while the data transfer was taking place. An embodiment of the invention may require a microphone channel being initialized 450, and a processor or associated communication component providing any necessary decoding interactions 460, in order to provide a data transfer from the analog recording to a digital data stream 470.

After the initial audio instructions is finished playing, the remainder of the CD data may be played back through the vehicle's sound system 480 redundantly until 470 all the data block has been read. In one embodiment, the data signal may be demodulated at the microphone and converted back to data before reaching the programmable device. Once demodulated 490, the data can then be used to reflash the devices software image or perform whatever other purpose is indicated in the block header 495.

One embodiment of the invention may provide a means to produce inexpensive updates for a programmable device or system. CDs can be produced and distributed in mass quantities. These updates can be done by the user, and may not require any special hardware, or a trip to the dealer to update the programmable device or system within the vehicle.

The above described methods and implementation for programming telematic and/or associated devices are example methods and implementations. These methods and implementations illustrate one possible approach for encoding, creating, and decoding data instructions for a TCU, peripheral, and/or mobile vehicle, and their associated devices. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects only as illustrative and not restrictive.

I claim:

1. A system, comprising:
    an in-vehicle media player for playing audio content stored on a media playable by the media player, wherein the audio content includes data encoded into an audio signal and audio instructions specifying procedures for a user to initiate an update of at least one programmable device;
    an in-vehicle device having a microphone capable of receiving the played audio content from the media player, wherein the in-vehicle device receives the audio signal through the microphone and includes a processor capable of decoding the data encoded into the audio signal, and wherein the in-vehicle device includes a programming function; and
    at least one programmable device on the vehicle that is updated by the in-vehicle device with the decoded data, wherein the update is initiated by the user using the procedures detailed in the audio instructions.

2. The system of claim 1, wherein the programmable device is within the in-vehicle device.

3. The system of claim 1, wherein the in-vehicle device comprises a telematics unit.

4. The system of claim 1, wherein the audio instructions specify procedures for placing the in-vehicle device in a user-initiated receive mode to initiate decoding the data encoded into the audio signal.

5. A vehicle system for obtaining data from an optical disk or other media, comprising: a media player that plays audio content over at least one speaker, wherein the audio content comprises encoded data stored on a media readable by the media player; an in-vehicle system having a microphone for receiving the audio content played inside the vehicle via the speaker; a processor capable of decoding the encoded data contained in the received audio content; and at least one vehicle electronic module having memory for storing program code, wherein the program code stored on the at least one vehicle electronic module is updated with the decoded data, wherein the in-vehicle system is capable of entering a user-initiated receive mode in which audio received via the microphone is sent to the processor for decoding.

6. The vehicle system of claim 5, wherein the media player is capable of playing the audio content from compact disk.

7. The vehicle system of claim 5, further comprising a vehicle sound system that is located within the vehicle and that includes the media player and the speaker.

8. The vehicle system of claim 5, wherein the processor comprises a part of the in-vehicle system.

9. The vehicle system of claim 8, wherein the in-vehicle system comprises a telematics unit.

10. The vehicle system of claim 5, wherein the in-vehicle system comprises a speech recognition system that processes speech received via the microphone.

11. The vehicle system of claim 5, wherein the in-vehicle system includes the at least one vehicle electronic module, whereby the decoded data is used to update the in-vehicle system.

12. The vehicle system of claim 5, wherein the audio content includes the encoded data along with audio instructions for playback to a vehicle occupant.

13. The vehicle system of claim 5, wherein the decoded data comprises new programming that is used as a firmware upgrade on the programmable device.

14. The system of claim 5, wherein the in-vehicle device is capable of entering a user-initiated receive mode in which audio received via the microphone is sent to the processor for decoding.

15. A method for vehicle users to update a programmable device on a vehicle using data stored on an audible media, comprising:
    (a) receiving an audible media containing an audible data stream that comprises a data signal modulated with data;
    (b) inserting the audible media into a vehicle media player on the vehicle;
    (c) receiving manual user input at the vehicle and initiating a receive mode in response to the user input;
    (d) audibly playing the data stream within the vehicle;
    (e) receiving the audible data stream inside the vehicle using a microphone;
    (f) obtaining the data by demodulating the modulated data signal in the data stream; and
    (g) updating the programmable device at the vehicle with the obtained data;
    wherein at least steps (d) and (e) are carried out in response to user input at the vehicle; and
    wherein the method further comprises the step of playing audio instructions to the vehicle user specifying how to initiate data transfer, with the audio instructions being accessed from the audible media and audibly played in the vehicle using the media player.

16. The method of claim 15, further comprising the step of flashing a vehicle electronic module with the obtained data.

17. The method of claim 15, wherein step (d) further comprises audibilizing the audible data stream using a vehicle sound system.

18. The method of claim 15, wherein the obtained data includes a block header containing information about the data.

19. A method of providing vehicle customers with new programming for use in upgrading a programmable device located onboard their vehicle, comprising the steps of:
  generating an audible data stream comprising at least in part a data signal modulated using the new programming;
  storing the audible data stream onto each of a plurality of audible media, wherein the audible data stream is readable from the media using a media player located in each customer's vehicle that can playback the audible data stream via one or more speakers; and
  distributing the plurality of audible media to the customers;
  wherein the generating step further comprising generating the audible data stream such that it includes the modulated data signal and audio instructions for playback via the media player to instruct the vehicle customer on how to carry out the upgrading of the programmable device using the audible media in the media player located in the customer's vehicle.

20. The method of claim 19, wherein the plurality of audible media comprise compact disks, on each of which is stored the audible data stream.

* * * * *